United States Patent Office 3,397,989
Patented Aug. 20, 1968

3,397,989
PHOTOGRAPHIC, GELATIN-CONTAINING LAYERS
Wolfgang Keberle, Leverkusen, Wolfgang Himmelmann, Cologne-Stammheim, Dieter Dieterich, Leverkusen, Otto Bayer, Burscheid, and Fritz Nittel, Cologne-Stammheim, Germany, assignors to Agfa-Gevaert Aktiengesellschaft, Leverkusen, Germany, a corporation of Germany
No Drawing. Filed Mar. 2, 1966, Ser. No. 531,022
Claims priority, application Germany, Mar. 17, 1965, A 48,664
6 Claims. (Cl. 96—114)

ABSTRACT OF THE DISCLOSURE

Gelatin in photographic layers is flexibilized by anionic polyurethane of linear compound that has two terminal hydroxy, carboxy or amino groups and a molecular weight from about 300 to about 20,000. The compound is reacted with a diisocyanate to form the polyurethane. Carboxy or sulfonic acid groups give the polyurethane anionic character, and such groups can be added by reacting a hydroxy or amino acid with the above compound and the diisocyanate.

The invention relates to gelatin layers, more especially for photographic materials, the mechanical properties of which are improved by addition of anionic polyurethanes.

In photography, it is mainly gelatin which is used as hydrophilic binding agent for light-sensitive silver halide emulsions and other auxiliary layers. The physical properties of a gelatin layer, e.g., brittleness, elasticity and resistance to cold are largely dependent on the atmospheric moisture. With relatively strong drying out, large tensile forces become operative and these can lead to the deformation of the support. Photographic emulsions which contain gelatin and which have been cast on triacetylcellulose films break at high degrees of dryness and under sudden bending stresses. The break often causes the support to also become broken. Consequently, many experiments have been made in order to improve the mechanical properties of such layers by using a gelatin plasticiser.

Hygroscopic substances such as alcohols or glycerine have been described as plasticisers, but these impart a moist handle to the layers, or they make the gelatin layers even more brittle at particularly low air humidities.

Furthermore it is known to add carboxylic acid amides in particular high polymeric acrylamides or copolymers thereof, more especially those with acrylates or acrylonitrile.

Nevertheless, all these products have various disadvantages, which consists particularly in the fact that the low molecular weight additives are rinsed out during the processing and thus the plasticizer effect is lost, and that the high polymeric plasticizer cause a photographically disturbing clouding of the layers.

A plasticizing effect on gelatin layers is also shown by polyether urethanes which contain in the polyurethane chain tertiary nitrogen atoms quaternized by reaction with alkylating agents or organic or inorganic acids. On account of their basic structure, these cationic polyurethanes have properties which are incompatible with color couplers in particular with dissolved diffusion-resistant couplers containing long-chained alkyl groups and sulfonic acid groups. Furthermore, the cationic polyurethanes are incompatible with anionic wetting agents which are generally employed in the production of photographic gelatin layers.

It has now been found that anionic polyurethanes are excellently suitable as plasticizers for photographic gelatin layers. Anionic polyurethanes are excellently compatible with color couplers, with gelatin, sensitizers or other anionic ingredients, such as wetting agents and do not deleteriously effect the photographic properties of the layers.

The anionic polyurethanes are of high molecular weight. Contrary to cationic polyurethanes, they are generally obtained free from components of low molecular weight. Thus, they need not be dialysed to remove products of low molecular weight which have a considerable deleterious fogging effect on the photographic layers.

The anionic polyurethanes which are to be used according to the invention are obtained from (I) compounds having a plurality of reactive hydrogen atoms and a molecular weight from 300 to 20,000 preferably up to 10,000, and particularly 500 to 4,000, (II) polyisocyanates and, if desirable, (III) chain-lengthening agents having reactive hydrogen atoms.

The anionic polyurethanes contain at least one salt-like group such as neutralized carboxyl or sulfonic acid groups. These groups can be contained in the compounds (I) having active hydrogen atoms, or they are introduced into the reaction product of component (I) with the polyisocyanate (II) as described hereinafter. During the preparation of these polyurethanes, or subsequent thereto, isocyanate groups still present are reacted with a (IV) compound having at least one hydrogen atom and at least one salt-like group, or a group capable of forming a salt. In the case where compounds having groups capable of forming a salt are used, the resulting anionic polyurethanes are at least particularly converted into the salt-form. According to another embodiment, the final polyurethanes are reacted with a cyclic compound, of the kind indicated below under IV, 2. In this case, the ring is split by addition of bonds having reactive hydrogen atoms, and an addition compound with an acid grouping is obtained. The proportion by weight of the salt-like groups amounts to more than 0.5% and at most 15%, or in the case of neutralized carboxyl groups at most 8%, calculated on the total weight of the anionic polyurethane.

The compounds suitable as starting components for the preparation of anionic polyurethanes include those described hereinafter.

I. COMPOUNDS WITH ACTIVE HYDROGEN ATOMS

These compounds are substantially linear and have a molcular weight of about 300 to 20,000 preferably up to 10,000 and advantageously 500 to 4,000. These compounds which are known per se, have terminal hydroxyl, carboxyl or amino groups; preferred are polyhydroxyl compounds, such as polyesters, polyacetals, polyethers, polyamides and polyesteramides. The hydroxyl number of these compounds is advantageously about 40 to 70, preferably 50 to 60.

Examples of polyethers are the polymerization products of ethylene oxide, propylene oxide, tetrahydrofuran or butylene oxide as well as their copolymerization and graft polymerization products, and also the condensates obtained by condensation of polyhydric alcohols or mixtures thereof and the products obtained by alkoxylation of polyhydric alcohols.

Suitable polyacetals are, for instance, the reaction products of hexanediol and formaldehyde.

Suitable polyesters, polyesteramides and polyamides, are condensates obtained from polyhydric saturated carboxylic acids and polyhydric saturated aliphatic alcohols, amino alcohols, diamines and mixtures thereof. The said polycondensates are preferably linear. Polyesters can be made of a dicarboxylic aliphatic acid containing up to 6 carbon atoms and a polyhydric alcohol containing up to 6 carbon atoms.

Polyhydroxyl compounds already containing urethane or urea groups as well as modified natural polyols, such as castor oil, and carbohydrates can also be used.

It is obvious that mixtures of different polyhydroxyl compounds can be introduced to vary the lyophilic nature or the hydrophobic nature and the mechanical properties of the products of the process.

II. POLYISOCYANATES

Suitable as polyisocyanates are all aromatic and aliphatic diisocyanates, for example, naphthylene-1,5-diisocyanate, diphenylmethane-4,4'-diisocyanate, diphenyldimethylmethane-4,4'-diisocyanate, dialkyl and tetraalkyl diphenylmethane diisocyanate, dibenzyl-4,4'-diisocyanate, phenylene-1,3-diisocyanate, phenylene-1,4 - diisocyanate, the isomers of toluylene diisocyanate, possibly in admixture, chlorinated and brominated diisocyanates, advantageously the aliphatic diisocyanates, butane-1,4-diisocyanate, hexane-1,6 - diisocyanate, dicyclohexylmethane diisocyanate and cyclohexane-1,4-diisocyanate.

The diisocyanates can be applied in admixture with a small amount of up to 5 mol percent of triisocyanates such as polymers of toluylene diisocyanate or aliphatic triisocyanates containing urea or biuret groupings, especially such triisocyanate with 1,6-hexane diisocyanate containing a biuret grouping, or the addition product of diisocyanates to poly-alcohols such as glycerin or trimethylolpropane.

III. CHAIN-LENGTHENING AGENTS

Suitable chain lengthening agents having reactive hydrogen atoms include:

(1) Glycols, such as ethylene glycol or condensates of ethylene glycol, butanediol, propane-1,2-diol, propane-1,3-diol, neopentyl glycol, hexanediol, bis-hydroxymethyl cyclohexane and dioxethyldiane;

(2) Aliphatic, cycloaliphatic and aromatic diamines, such as ethylene diamine, hexamethylene diamine, cyclohexylene - 1,4 - diamine, benzidine, diaminodiphenyl methane, the isomers of phenylene diamine, hydrazine and ammonia;

(3) Amino alcohols, such as ethanolamine, propanolamine and butanolamine;

(4) Polyfunctional amines or hydroxyl compounds, such as diethylene triamine, triethylene tetramine, tetraethylene pentamine, pentaethylene hexamine, hexaethylene heptamine, glycerine, erythritol, 1,3-diamino-isopropanol, 1,2-diamino-propanol, the monooxalkylated polyamines, such as N-oxethylethylene diamine, N-oxethylhydrazine and N-oxethylhexamethylene diamine;

(5) Water.

IV. COMPOUNDS CAPABLE OF FORMING A SALT (1) Compounds having an acid grouping:

(a) Hydroxy acids, such as glyceric acid, lactic acid, trichlorolactic acid, malic acid, dihydroxymaleic acid, dihydroxyfumaric acid, tartaric acid, dihydroxy tartaric acid, citric acid, glyceroboric acid, pentaerythritolboric acid, mannitol-boric acid, salicyclic acid, 2,4-dihydroxybenzoic acid, protocatechuic acid, α-resorcyclic acid, β-resorcylic acid, hydroquinone - 1,5 - dicarboxylic acid, 4-hydroxy isophthalic acid, 4,6-dihydroxy isophthalic acid, hydroxyterephthalic acid, 5,6,7,8 - tetrahydro-2-naphthol-3-carboxylic acid, 1-hydroxy-2-naphthoic acid, 2,8-dihydroxy - 3 - naphthoic acid, β - hydroxypropionic acid, m-hydroxybenzoic acid and 2,6-bis-hydroxymethyl-p-cresol;

(b) Aliphatic, cycloaliphatic, aromatic and heterocyclic monoamino and diamino carboxylic acids, such as glycine, α- and β-alanine, 6-aminocaproic acid, 4-aminobutyric acid, the isomeric monoamino and diamino benzoic acids, the isomeric monoamino and diamino naphthoic acids; lysine, and ornithine.

(c) Hydroxy-sulfonic and carboxy-sulfonic acids; 2-hydroxyethane sulfonic acid, phenol-2-sulfonic acid, phenol-3-sulfonic acid, phenol-4-sulfonic acid, phenol-2,4-disulfonic acid, sulfoacetic acid, m-sulfobenzoic acid, p-sulfobenzoic acid, benzoic acid-3,5-disulfonic acid, 2-chlorobenzoic acid - 4 - sulfonic acid, 2 - hydroxybenzoic acid-5-sulfonic acid, naphthol-1-sulfonic acid, naphthol-1-disulfonic acid, 8-chloronaphthol - 1 - disulfonic acid, naphthol-1-trisulfonic acid, naphth-2-ol-1-sulfonic acid, naphthol-2-trisulfonic acid, 1,7-dihydroxy naphthalene-3-sulfonic acid, 1,8-dihydroxynaphthalene-2,4-disulfonic acid, chromotropic acid and 2-hydroxynaphthoic-3-carboxylic acid-6-sulfonic acid;

(d) Aminosulfonic acids: Hydroxylamine monosulfonic acid, hydrazine disulfonic acid, sulfanilic acid, N-phenylamino methane sulfonic acid, 4,6-dichloroaniline-1-sulfonic acid, phenylene-1,3-diamine-4,6-disulfonic acid, naphthylamine-1-sulfonic acid, naphthylamine trisulfonic acid, 4,4'-di-(p-aminobenzylamino)-diphenyl urea-3,3'-disulfonic acid, phenylhydrazine - 2,5 - disulfonic acid, taurin, methyltaurin, butyltaurin, ditaurin, 3-amino-benzoic-1-carboxylic acid, 5-sulfonic acid, 3-amino-toluene-N-methane sulfonic acid, 4,6-diaminobenzene-1,3-disulfonic acid, 2,4-diaminotoluene-5-sulfonic acid, 4,4'-diaminodiphenyl-2,2'-disulfonic acid, 2-amino-phenol-4-sulfonic acid, 4,4'-diaminodiphenylether-2-sulfonic acid, 2-aminoanisol-N-methane sulfonic acid, 2-aminodiphenyl amine sulfonic acid and 2,4-diaminobenzene sulfonic acid;

(e) Hydroxy-carboxylic, aminocarboxylic, hydroxysulfonic, aminosulfonic, polycarboxylic and polysulfonic acids also include addition products of unsaturated acids (such as acrylic acid, methacrylic acid, vinyl-sulfonic acid and styrene-sulfonic acid) and the saponified addition products of unsaturated nitriles (such as acrylonitrile), and cyclic dicarboxylic acid anhydrides (such as maleic, phthalic and succinic anhydrides), and sulfocarboxylic anhydrides (such as sulfoacetic and o-sulfobenzoic anhydrides), and of lactones (such as β-propiolactone and γ-butyrolactone), the addition products of the reaction products of olefines with sulfur trioxide (such as the carbylsulfate) or epoxycarboxylic and epoxysulfonic acids (such as glycidic acid, 2,3-epoxypropane-sulfonic acid), of sultones (such as 1,3-propanesultone, 1,4-butanesultone and 1,8-naphthsultone), of cyclic sulfates (such as glycol sulfate), of disulfonic acid anhydrides (such as benzene-1,2-disulfonic acid anhydride) with:

Aliphatic and aromatic amines (such as ethylene-1,2-diamine, hexamethylene-1,6-diamine, the isomeric phenylene diamines, diethylene triamine, triethylene tetramine, tetraethylene pentamine and pentaethylene hexamine), alkylated hydrazines, ammonia, amino alcohols (such as hydroxy alkyl substituted amines and hydrazines such as ethanolamine, diethanolamine, triethanolamine, ethanolethylene diamine and ethanolhydrazine), alcohols (such as ethylene glycol, propylene glycol, butane-1,2- and 1,4-diol, hexane-1,6-diol), polyhydric alcohols (such as trimethylolpropane, glycerine and hexanetriol);

The (if desired hydrogenated) addition products of epoxy and ethylene imine compounds (such as ethylene oxide, propylene oxide, butylene oxide, styrene oxide, and ethylene imine) and unsaturated nitriles, such as acrylonitrile, with aliphatic and aromatic amino carboxylic and amino sulfonic acids;

The reaction products of hydroxy-alkane-sulfonic acids, halocarboxylic acids and halosulfonic acids, with hydrazines or alkylated hydrazines (such as hydrazine-acetic acid, hydrazine-ethanesulfonic acid and hydrazine-methanesulfonic acid);

The saponified addition products of cyanhydrins with hydrazines (such as 1,2-hydrazine-bis-isobutyric acid);

Also the addition products of sodium hydrogen sulfite with olefinically unsaturated compounds (such as allyl alcohol, maleic acid, maleic-bis-ethylene and maleic-bis-propylene glycol esters;

(f) Hydrazine-carboxylic acids, such as hydrazine-dicarboxylic acids.

(2) Reactive-cyclic compounds with 3 to 7 ring members, comprising salt-like groups or groups which are capable of forming a salt after opening of the ring, such as (a) Dicarboxylic anhydrides, such as succinic anhydride, maleic anhydride, phthalic anhydride or hydrogenated phthalic anhydride, (b) Tetracarboxylic dianhydrides, such as benzene-1,2,4,5-tetracarboxylic dianhydride;

(c) Disulfonic anhydrides, such as benzene-1,2-disulfonic-anhydride;

(d) Sulfocarboxylic anhydrides, such as sulfoacetic anhydride and o-sulfobenzoic anhydride;

(e) Sultones, such as propane-1,3-sultone, butane-1,4-sultone and naphth-1,8-sultone;

(f) Lactones, such as $\beta$-propiolactone and $\gamma$-butyrolactone;

(g) Epoxycarboxylic acids, such as glycidic acid, optionally in the form of their alkali metal salts;

(h) Epoxysulfonic acids, such as 2,3-epoxypropane-1-sulfonic acid, if desired in the form of their alkali metal salts, as well as the addition products of epoxy aldehydes and alkali metal hydrogen sulfites, such as, for example, the bisulfite compound of glycide aldehyde;

(i) Reaction products of olefines with sulfur trioxide, such as carbylsulfate;

(j) Cyclic sulfates, such as glycol sulfate.

The above acid groupings can be converted into the salt form in the usual manner by reaction with the compounds hereinafter mentioned:

Inorganic bases or compounds splitting off bases, such as monovalent metal hydroxides, carbonates and oxides, e.g., sodium hydroxide, potassium hydroxide, sodium carbonate, potassium carbonate and sodium hydrogen carbonate.

For the introduction of a salt-like group, in particular a neutralized carboxyl or sulfo group, into the reaction product of components (I) and (II) mentioned hereinbefore, the following compounds having active hydrogen atoms capable of reacting with isocyanate groups and having a salt-forming group are preferred aliphatic mono- or diamino-sulfonic acids such as taurin or ethyltaurin; addition products of aliphatic sultones with aliphatic diamines, such as addition products of propane sultone or butane sultone with ethylene diamine or hexamethylene diamine. According to a preferred embodiment the polyisocyanates is applied in such an amount that all groups capable of reaction with isocyanate groups are reacted.

The reaction can be carried out with concurrent use of solvents, preferably low-boiling solvents, such as acetone, ethanol, methanol, tert.-butanol, methylethyl ketone, if desired in admixture with water. As solvents for inorganic bases and the compounds with at least one hydrogen atom capable of reacting with isocyanate groups and at least one salt-like group, or a group capable of forming a salt, it is possible to use water, optionally with additions of organic solvents.

The predominantly linear anionic polyurethane of high molecular weight formed are extracted by addition of water and the organic solvents are simultaneously or subsequently removed. Dispersions are obtained in the form of pastes or solutions.

Suitable anionic polyurethanes are, for example, the following polyaddition products:

Compound 1

Polyaddition product of 218.5 g. of adipic acid-hexanediol-neopentyl glycol polyester (OH-number 63), 55 g. of hexane-1,6-diisocyanate and 27.8 g. of sodium 1,2-diaminoethane-N-propane sulfonate.

Compound 2

Polyaddition product of 218.5 g. of adipic acid-hexanediol-neopentyl glycol polyester (OH-number 63), 55 g. of hexane-1,6-diisocyanate and 29.8 g. of potassium 1,2-diaminoethane-N-propane sulfonate.

Compound 3

Polyaddition product of 218.5 g. of adipic acid-hexanediol-neopentyl glycol polyester (OH-number 63), 30.6 g. of hexane-1,6-diisocyanate and 31.9 g. of a 20% aqueous sodium aminoethane sulfonate solution.

Compound 4

Polyaddition product of 218.5 g. of adipic acid-hexanediol-neopentyl glycol polyester (OH-number 63), 45.5 g. of hexane-1,6-diisocyanate and 138.0 g. of a 20% aqueous sodium aminoethane sulfonate solution.

Compound 5

Polyaddition product of 218.5 g. of adipic acid-hexanediol-neopentyl glycol polyester (OH-number 63), 44.2 g. of hexane-1,6-diisocyanate and 92.0 g. of 20% aqueous sodium aminoethane sulfonate solution.

Compound 6

Polyaddition product of 218.5 g. of adipic acid-hexanediol-neopentyl glycol polyester (OH-number 63), 39.0 g. of hexane-1,6-diisocyanate and 92.0 g. of a 20% aqueous sodium aminoethane sulfonate solution.

Compound 7

Polyaddition product of 218.5 g. of adipic acid-hexanediol-neopentyl glycol polyester (OH-number 63), 32.6 g. of hexane-1,6-diisocyanate and 46 g. of a 20% aqueous sodium aminoethane sulfonate solution.

Compound 8

Polyaddition product of 218.5 g. of adipic acid-hexanediol-neopentyl glycol polyester (OH-number 63), 34.6 g. of hexane-1,6-diisocyanate and 61.2 g. of a 20% aqueous sodium aminoethane sulfonate solution.

Compound 9

Polyaddition product of 218.5 g. of adipic acid-hexanediol-neopentyl glycol polyester (OH-number 63), 52.0 g. of hexane-1,6-diisocyanate and 184.0 g. of a 20% aqueous sodium aminoethane sulfonate solution.

Compound 10

Polyaddition product of 218.5 g. of adipic acid-hexanediol-neopentyl glycol polyester (OH-number 63), 42.0 g. of hexane-1,6-diisocyanate, 12.9 of diethylenetriamine, 12.5 g. of succinic anhydride and 4.9 g. of potassium hydroxide.

Compound 11

Polyaddition product of 218.5 g. of adipic acid-hexanediol-neopentyl glycol polyester (OH-number 63), 42.0 g. of hexane-1,6-diisocyanate, 12.9 g. of diethylenetriamine, 12.5 g. of succinic anhydride and 6.3 g. of potassium hydroxide.

Compound 12

Polyaddition product of 218.5 g. of adipic acid-hexanediol-neopentyl glycol polyester (OH-number 63), 38.0 g. of hexane-1,6-diisocyanate, and 14.9 g. of potassium-1,2-diaminoethane-N-propane sulfonate.

Compound 13

Polyaddition product of 218.5 g. of adipic acid-hexanediol-neopentyl glycol polyester (OH-number 63), 32.5 g. of hexane-1,6-diisocyanate and 7.5 g. of potassium-1,2-diaminoethane-N-propane sulfonate.

Compound 14

Polyaddition product of 218.5 g. of adipic acid-hexanediol-neopentyl glycol polyester (OH-number 63), 36.7 g. of hexane-1,6-diisocyanate and 11.2 g. of potassium-1,2-diaminoethane-N-propane sulfonate.

Compound 15

Polyaddition product of 106.3 g. of adipic acid-hexanediol-neopentyl glycol polyester (OH-number 65.85), 128.5 g. of hexane-1,6-diisocyanate and 52.0 g. of neopentyl glycol, and 29.8 g. of potassium-1,2-diaminoethane-N-propane sulfonate.

Compound 16

Polyaddition product of 106.3 g. of adipic acid-hexanediol-neopentyl glycol polyester (OH-number 65.85), 250.0 g. of hexane-1,6-diisocyanate, 53.0 g. of diethylene glycol, 52.0 g. of neopentyl glycol and 29.8 g. of potassium-1,2-diaminoethane-N-propane sulfonate.

Compound 17

Polyaddition product of 106.3 g. of adipic acid-hexanediol-neopentyl glycol polyester (OH-number 65.85), 121.0 g. of hexane-1,6-diisocyanate, 26.5 g. of diethylene glycol, 26.0 g. of neopentyl glycol and 29.8 g. of potassium-1,2-diaminoethane-N-propane sulfonate.

Compound 18

Polyaddition product of 212.5 g. of adipic acid-hexanediol-neopentyl glycol polyester (OH-number 65.85), 89.0 g. of hexane-1,6-diisocyanate and 59.6 g. of potassium-1,2-diaminoethane-N-propane sulfonate.

Compound 19

Polyaddition product of 212.5 g. of adipic acid-hexanediol-neopentyl glycol polyester (OH-number 65.85), 72.0 g. of hexane-1,6-diisocyanate and 44.7 g. of potassium-1,2-diaminoethane-N-propane sulfonate.

Compound 20

Polyaddition product of 250.0 g. of polypropylene glycol (OH-number 56), 48.9 g. of hexane-1,6-diisocyanate and 29.8 g. of potassium-1,2-diaminoethane-N-propane sulfonate.

Compound 21

Polyaddition product of 106.5 g. of adipic acid-hexanediol-neopentyl glycol polyester (OH-number 65.85), 380 g. of hexane-1,6-diisocyanate, 104 g. of neopentyl glycol, 106 g. diethylene glycol and 29.8 g. of potassium-1,2-diaminoethane-N-propane sulfonate.

Compound 22

Polyaddition product of 106.5 g. of adipic acid-hexanediol-neopentyl glycol polyester (OH-number 65.85), 340 g. of 1,6-hexane-diisocyanate, 91.0 g. of neopentyl glycol, 92.8 g. of diethylene glycol and 29.8 g. of potassium-1,2-diaminoethane-N-propane sulfonate.

Compound 23

Polyaddition product of 106.5 g. of adipic acid-hexanediol-neopentyl glycol polyester (OH-number 65.85), 205 g. of hexane-1,6-diisocyanate, 52.0 g. of neopentyl glycol, 53.0 g. of diethylene glycol and 29.8 g. of potassium-1,2-diaminoethane-N-propane sulfonate.

Compound 24

Polyaddition product of 420 g. of adipic acid-hexanediol-neopentyl glycol polyester (OH-number 65.85), 65.2 g. of hexane-1,6-diisocyanate and 16.4 g. of glycine-potassium.

Compound 25

Polyaddition product of 210.5 g. of adipic acid-hexanediol-neopentyl glycol polyester (OH-number 65.85), 40.0 g. of hexane-1,6-diisocyanate and 11.8 g. of potassium-N-($\beta$-aminoethyl)-$\beta$-anminopropionate.

Compound 26

Polyaddition product of 207.0 g. of adipic acid-hexane-diol-polyester (OH-number 65.85), 53.0 of hexane-1,6-diisocyanate and 11.8 g. of potassium-N-($\beta$-aminoethyl)-$\beta$-aminopropionate.

The above compounds can be prepared in accordance with the following general procedure:

The polyhydroxyl compound is dehydrated for 30 minutes at 120° C. in vacuo and thereafter reacted with the diisocyanate and, if desired, with the chain-lengthening agents. After cooling the prepolymer to 55° C., the melt is taken up in acetone or tertiary butanol and reacted with an aqueous solution of the compound having at least one hydrogen atom capable of reacting with isocyanate groups and at least one salt-like group, or a group capable of forming a salt. In the case of the subsequent introduction of anionic groups, the polyurethanes are reacted in solution, for instance, in acetone or tertiary butanol with the cyclic compounds at a temperature of between 20 to 150° C. to produce a polyurethane with groups capable of forming salts. The last mentioned groups are transformed at least partially into salt form by adding inorganic bases at room temperature. For the subsequent introduction of anionic groups, polyurethanes containing free primary and/or secondary hydroxyl and/or amino groups, hydrazide, urea and amide groups, are preferably employed. After completing the reaction, water is added and the solvent is distilled off in vacuo.

The aqueous solution or dispersion of the anionic polyurethane which is obtained can be added directly to the casting solution for the gelatin layer without isolating the polyurethane. The dispersions or solutions of the anionic polyurethane can be added directly to the emulsions prior to casting in the desired ratio, for instance, 1:1 to 1:2.

The concentration of the anionic polyurethanes in the photographic gelatin layers can vary widely, for example, from 0.05 to 1 and advantageously 0.1 to 0.5 part by weight per 1 part by weight of gelatin. The anionic polyurethanes can, however, be added in higher concentrations of up to 5 parts by weight of dried gelatin. The specific concentration will vary according to the type of photographic layer and according to the effects desired. The suitable and most economic concentration for any given photographic layer will be apparent to those skilled in the art upon making the tests customarily used in the photographic art.

The gelatin plasticised by an addition of the compounds according to the invention can be modified in the usual way with other additives, e.g., water-soluble and water-insoluble compounds of high molecular weight, such as:

Polyvinyl pyrrolidone, polyvinyl methyl ether, polyvinyl alcohol, polyacrylic and methacrylic acids, polymaleic acid, polystyrene-sulfonic acid, polyvinyl-sulfonic acid and copolymers of these compounds, as well as natural substances such as gum arabic, dextrans, levans, other soluble polysaccharides and their derivatives, provided they have no cationic grouping.

Water-insoluble compounds which can be added are, for instance, latices of polyacrylic esters and their copolymers and polyvinyl ethers and their copolymers which are compatible with gelatin. Furthermore, the compounds according to the invention can be combined with advantage with dispersions of water-insoluble polyethers of the type described in Belgian patent specification 668,547 or with dispersions of other water-insoluble compounds boiling higher than 250° C.

The anionic polyurethanes are particularly useful with photographic emulsions containing diffusion-resistant water-soluble color couplers substituted with long aliphatic radicals. The solutions and dispersions of the polyurethane have good compatability with the aqueous solutions of the color components.

The layers which are obtained are less brittle and have a lower tendency to curling and nevertheless have a good adhesion with the support. The photographic properties are practically unchanged, no fogging or decrease in sensitivity occurs. In many cases, a reduction of the background fogging is observed after the samples have been stored in a heating chamber.

The conventional additives, such as hardeners, wetting agents, optical sensitizers, chemical sensitizers etc. can be used according to common practice. The anionic polyurethanes are compatible with all the additions customarily employed. The anionic polyurethanes can be used for any kind of photographic gelatin layers, such as light-sensitive silver halide gelatin emulsions on a paper support or on support of cellulose esters such as cellulose acetate, polyesters, in particular of terephthalic acid and ethylene glycol, polycarbonates, preferably of bis-phenylol alkanes and the like, gelatin-containing protective and photographic auxiliary layers, such as baryta layers on paper, or subbing layers on hydrophobic supports, mentioned hereinbefore.

EXAMPLE 1

In each case, to 1 kg. of a silver chlorobromide emulsion ready for casting and containing about 65 g. of gelatin, there are added 19.5 g. of (1) Compound 6
(2) Compound 7
(3) Compound 8
(4) Compound 12 in the form of a 10% aqueous solution in acetone while stirring. Thereafter, 40 ml. of a 10% aqueous saponine solution as wetting agent and 4 ml. of a 30% aqueous formaldehyde solution as hardener were added. The emulsion is applied on a cellulose triacetate support and dried.

The samples are exposed and developed, respectively before and after storage for 3 days in a heating chamber at 60° C.

The developer bath has the following composition:

| | G. |
|---|---|
| p-Methylaminophenol | 1 |
| Anhydrous sodium sulfite | 13 |
| Hydroquinone | 1.8 |
| Anhydrous sodium carbonate | 4.6 |
| Potassium bromide | 1.6 |
| Water to make up 1 liter. | |

The development time was 11 minutes. After fixing in an acid fixing bath and rinsing for 25 minutes, the samples are dried.

The fixing bath has the following composition:

| | G. |
|---|---|
| Sodium thiosulfate | 250 |
| Potassium metabisulfite | 25 |
| Water up to 1000 ml. | |

The adhesion with the support is good.

EXAMPLE 2

To separate parts of a mixture of 1 liter of a photographic emulsion, which contains
35 g. of silver halide and
80 g. of gelatin are added in each case 30% by weight based on the gelatin of the compounds 1 to 7 and 9 to 14 with vigorous stirring. Thereafter, 24 g. of 1-hydroxy-4-sulfo-2-naphthoic acid heptadecyl amide are added as cyan color coupler. The wetting agents and hardeners mentioned in Example 1 were added and the emulsion cast onto a cellulose acetate support and dried. The thickness of the layers is about 18μ. Test strips with a length of 30 cm. and a width of 1.5 cm. of the samples are each subjected for 48 hours to a conditioned air of 35% and 50% relative humidity at 22° C., in accordance with the standard for negative cine film as described in Final Fiat Report 943, page 85. The brittleness is determined by means of a test method which is hereinafter described.

The film strips are drawn with the layer side outermost over two ball-mounted guide rollers (roller diameter 5 mm.), which bend the film at an interval of 1.5 cm. twice at a right angle. The film is tensioned by a weight of 1 kg. and is drawn periodically over the two guide rollers by an eccentric arrangement. With each travel, the film is subjected to strong mechanical stress and breaks after a certain number of travels. This number is automatically established and provides a value for the mechanical quality of a film; the higher the value which is reached, the better is the mechanical quality of the film. The values listed are average values of four measurements. On reaching the value 1500, the measurement was stopped. Only films of excellent quality show this value. Furthermore, at values above 1500, the brittleness of the support greatly affects the measurement.

RESULT

| Addition | No. of strokes | |
|---|---|---|
| | 35% rel. air humidity | 50% rel. air humidity |
| 0% | 55 | 135 |
| 30% Compound 1 | 1,500 | 1,500 |
| 30% Compound 2 | 1,500 | 1,500 |
| 30% Compound 3 | 1,500 | 1,500 |
| 30% Compound 4 | 1,500 | 1,500 |
| 30% Compound 5 | 1,500 | 1,500 |
| 30% Compound 6 | 1,210 | 1,500 |
| 30% Compound 7 | 1,360 | 1,500 |
| 30% Compound 9 | 1,260 | 1,500 |
| 30% Compound 10 | 800 | 1,500 |
| 30% Compound 11 | 1,500 | 1,500 |
| 30% Compound 12 | 1,500 | 1,500 |
| 30% Compound 13 | 1,240 | 1,500 |
| 30% Compound 14 | 1,220 | 1,500 |

All additives reduce the brittleness of the layers containing the color component, at 35% relative air humidity. The brittleness of the layers without additive is particularly high, as can be seen from the above table.

The layers are completely clear and do not show any oily depositions on the surface. The tendency of the films to curl is reduced. The final color images do not show any photographic disadvantages such as lowering of sensitivity or increase in fogging.

EXAMPLE 3

To a solution of a photographic gelatin in water, which contains 0.3% of formalin as well as 0.5% of the filter dyestuff Tartrazine, 50% of Compound 20 is added (all percentages are by weight and related to gelatin). The casting solution is cast onto a plate of Plexiglas and the layer is carefully dried in the absence of dust. The resulting foil has a thickness of about 100μ and is thoroughly dried for 2 hours at 50° C. and adapted for a few minutes to a conditioned air of 50% relative air humidity. While a foil without addition of the anionic polyurethane splits upon sharp bending, the foil with the additive is elastic. The color tone of the filter dye is unchanged.

EXAMPLE 4

A 10% acetone solution of a cyan color component (1-hydroxy-4-sulfo-2-naphthoic acid heptadecylamide) is mixed with the same quantity of a 10% aqueous solution of Compound 7. A slightly opaque solution is obtained, which can serve as storage solution for the preparation of color emulsion layers (see Example 2). The anionic polyurethanes have particularly good compatibility with the anionic color couplers.

EXAMPLE 5.—PREPARATION OF A CONCENTRATED GELATIN DISPERSION

In order to be able to use the compounds according to the invention in finely dispersed form in photographic emulsions, a preliminary dispersion is effected with an efficient stirrer arrangement as follows:

Into a solution of 10 liters of 10% gelatin and
1.5 liters of 10% saponin solution, there are introduced with vigorous stirring 5.75 kg. of a 35% aqueous solution of Compound 7 in acetone.

The solidified mixture can be stored without any change in a refrigerator and can be added to any casting solution for any desired photographic layers. A few examples are given below:

(a) 350 g. of the above mixture are added to 1 kg. of a photographic silver halide emulsion containing about 80 g. of gelatin and 4.5 g. of 3-(p-stearoylamino-benzoyl-acetamino)-isophthalic acid as yellow color coupler.

(b) 350 g. of the above mixture are added to 1 kg. of a photographic silver halide emulsion containing 80 g. of gelatin and 4 g. of 1-(3'-sulfo-4'-phenoxy)-phenyl-3-heptadecyl-5-pyrazolone as magenta color coupler.

(c) 350 g. of the above mixture are added to 1 kg. of a photographic silver halide emulsion containing 80 g. of gelatin and 4 g. of 1-hydroxy-4-sulfo-2-naphthoic acid octadecylamide as cyan color coupler.

(d) 350 g. of the above-mentioned mixture are added to 1 kg. of the casting solution for a protective layer containing 80 g. of gelatin.

(e) 350 g. of the above-mentioned mixture are added to 1 kg. of a photographic black-and-white emulsion.

(f) 430 g. of the above mixture are added to 1 kg. of a 10% gelatin solution and thereafter 2 kg. of a 50% aqueous baryta paste is added while stirring. The mixture is used for the baryta-coating of photographic paper. The baryta paste had the following composition:

| | Percent |
|---|---|
| BaSO$_4$ | 50 |
| Water | 45 |
| Sodium polyphosphate | 5 |

The above casting solutions (a) to (f) are applied to paper supports and dried.

The resulting layers have a considerably reduced brittleness. This effect is pronounced at low relative air humidity. Sensitivity, fogging, characteristic curve color brilliance, etc., are not deleteriously effected. The brittleness of the layers is determined by the following method. The coated papers are stored for 3 days at 30% relative air humidity and are then pulled in succession over rollers of different diameters (60 mm. to 10 mm.). The brittleness value is the diameter in mm. at which the paper breaks. The pliability of the layer is better as this value is smaller. A processed unexposed white sheet, a processed exposed black sheet and also the unprocessed material are tested. The results are given in the following table.

| | Test Sample, mm. | Without addition, mm. |
|---|---|---|
| Processed white sheet | 10 | 25 |
| Processed black sheet | 10 | 30 |
| Unprocessed material | 10 | 20 |

The results with the materials of Examples 5b to 5f are similar.

EXAMPLE 6

The casting solution for photographic layers described below are applied onto a suitable sheet-like support of a cellulose ester, a polyester of ethylene glycol and terephthalic acid, or a polycarbonate of a bis-phenylol alkane or a paper support which can be lined, for example, with polyethylene.

(a) 1 kg. of a silver halide gelatin emulsion, the silver halide of which consists essentially of silver bromide, which contains 80 g. of gelatin, 4 g. of the magenta coupler 1-(3'-sulfo-4'-phenoxy)-phenyl-3-heptadecyl-pyrazolon-(5) and 87 g. of a 46% aqueous dispersion of compound 25.

(b) 1 kg. of silver halide gelatin emulsion, the silver consisting essentially of silver bromide, which contains 80 g. of gelatin and 4 g. of the magenta coupler 1-(3'-sulfo-4'-phenoxy)-phenyl-3-heptadecyl - pyrazolon-(5) and 372 g. of a 43% aqueous dispersion of the anionic polyurethane 26.

(c) 1 kg. of silver halide gelatin emulsion, the silver consisting essentially of silver bromide, which contains 80 g. of gelatin and 4 g. of the cyanine coupler 1-hydroxy-4-sulfo-2-naphthoic acid-octadecylamide and 97.5 g. of a 41% aqueous dispersion of the anionic polyurethane 24.

(d) 1 kg. of silver halide gelatin emulsion, the silver consisting essentially of silver bromide, which contains 80 g. of gelatin and 320 g. of a 50% aqueous dispersion of the anionic polyurethane 7.

(e) 1 kg. of a silver halide gelatin emulsion, the silver halide of which consists essentially of silver chloride, which contains 80 g. of gelatin and 4.5 g. of the yellow coupler and 334 g. of a 48% aqueous dispersion of compound 23.

(f) 1 kg. of a silver bromide gelatin emulsion, the silver halide of which comprises 5 mol percent of silver iodide, which contains 80 g. of gelatin and 80 g. of a 50% aqueous dispersion of the anionic polyurethane 21.

(g) 1 kg. of a silver bromide gelatin emulsion, the silver halide of which comprises 5 mol percent of silver iodide, which contains 80 g. of gelatin and 174 g. of a 46% aqueous dispersion of the anionic polyurethane 22.

(h) 1 kg. of a silver bromide gelatin emulsion, the silver halide of which comprises 5 mol percent of silver iodide, which contains 80 g. of gelatin and 320 g. of a 50% aqueous dispersion of the anionic polyurethane 7.

(i) A casting solution for a protective layer which contains per kg. 80 g. of gelatin and 80 g. of a 50% aqueous dispersion of the anionic polyurethane 7.

(j) A casting solution for a protective layer which contains per kg. 80 g. of gelatin and 525 g. of a 46% aqueous dispersion of the anionic polyurethane 25.

(k) To 1 kg. of a 10% aqueous gelatin solution are added 100 g. of a 50% aqueous dispersion of the anionic polyurethane 7 and 2 kg. of a 50% aqueous baryta paste having the composition indicated in Example 5f.

The above mixture is applied as a baryta coating on paper supports.

(l) To 1 kg. of a 10% aqueous gelatin solution are added 244 g. of a 41% aqueous dispersion of the anionic polyurethane 24 and 2 kg. of a 50% aqueous baryta paste, having the above mentioned composition.

(m) To 1 kg. of a 10% aqueous gelatin solution are added 600 g. of a 50% aqueous dispersion of the anionic polyurethane 7 and 2 kg. of a 50% aqueous baryta paste having the above mentioned composition.

(n) A subbing layer of hydrophobic supports, for example a paper support lined with polyethylene, is cast from the following composition:

1 kg. of a 10% aqueous gelatin solution, and 200 g. of a 50% aqueous dispersion of the anionic polyurethane 7.

(o) A subbing layer for hydrophobic supports, for example a paper support lined with polyethylene, is cast from the following composition:

1 kg. of a 10% aqueous gelatin solution, and 425 g. of a 46% aqueous dispersion of the anionic polyurethane 25.

(p) A subbing layer for hydrophobic supports, for example a paper support lined with polyethylene, is cast from the following composition:

1 kg. of a 10% aqueous gelatin solution, and 220 g. of a 46% aqueous dispersion of the anionic polyurethane 25.

The photographic layer obtained with the above casting solutions show reduced brittleness even at low air humidity. The photographic properties such as sensitivity fogging, and the characteristic curve are not impaired. In the case of color photographic material the resulting color photographic images are more brilliant. The developability of the photographic layers are not impaired even if the anionic polyurethanes are added in high concentrations.

We claim:

1. A photographic material having at least one gelatin layer which layer is flexibilized by a content of from 0.05 to 5 parts by weight of an anionic polyurethane per part of gelatin, the anionic polyurethane being a sulfonated or carboxylated polyurethane of essentially a linear compound that has two terminal hydroxyl, carboxyl or amino groups and also has a molecular weight of about 300 to about 20,000.

2. The combination of claim 1 in which the linear compound is a polyester of a dicarboxylic aliphatic acid containing up to 6 carbon atoms, with at least one polyhydric aliphatic alcohol containing up to 6 carbon atoms.

3. The combination of claim 2 in which the acid is adipic acid.

4. The combination of claim 1 in which the sulfonate and carboxyl groups total about 0.5 to about 15% by weight of the polyurethane.

5. The combination of claim 1 in which the gelatin layer is a light-sensitive silver halide emulsion.

6. The combination of claim 5 in which the gelatin layer also contains a color coupler.

References Cited

UNITED STATES PATENTS

| | | | |
|---|---|---|---|
| 3,038,804 | 6/1962 | Knox et al. | 96—111 |
| 3,235,381 | 2/1966 | Field et al. | 96—87 |
| 3,255,000 | 6/1966 | Gates et al. | 96—111 |
| 3,305,376 | 2/1967 | Burness et al. | 96—111 |

NORMAN G. TORCHIN, *Primary Examiner.*

R. E. MARTIN, *Assistant Examiner.*